United States Patent [19]

Calhoun

[11] Patent Number: 5,624,485
[45] Date of Patent: Apr. 29, 1997

[54] WATER BASED RECORDING FLUID

[75] Inventor: Larry G. Calhoun, Dayton, Ohio

[73] Assignee: Scitex Digital Printing, Inc., Dayton, Ohio

[21] Appl. No.: 524,998

[22] Filed: Sep. 8, 1995

[51] Int. Cl.⁶ .................................... C09D 11/02
[52] U.S. Cl. ............................ 524/386; 106/31.4
[58] Field of Search ...................... 106/22 R, 22 F

[56] References Cited

U.S. PATENT DOCUMENTS

| | | | |
|---|---|---|---|
| 4,153,593 | 5/1979 | Zabiak et al. | 106/22 B |
| 4,567,213 | 1/1986 | Bhatia et al. | 106/22 E |
| 4,834,799 | 5/1989 | Song | 106/20 D |
| 4,963,188 | 10/1990 | Parker | 106/20 R |
| 5,039,339 | 8/1991 | Phan et al. | 106/20 R |
| 5,106,417 | 4/1992 | Hauser et al. | 106/20 D |
| 5,244,496 | 9/1993 | Easton et al. | 106/20 D |
| 5,439,515 | 8/1995 | Kurabayashi et al. | 106/20 R |

*Primary Examiner*—Helene Klemanski
*Attorney, Agent, or Firm*—Barbara Joan Haushalter

[57] ABSTRACT

An ink jet ink composition comprises a water soluble polymer, a cosolvent, a water soluble dye, a surfactant, and water as a primary vehicle. The water soluble polymer, the cosolvent, and the surfactant are all present in extremely low amounts. The water soluble polymer is present in a range of from about 0.05 to 0.10%; the cosolvent, or glycol ether blend, is present in a range of from about 0.10 to 2.00%; and the surfactant is present in a range of from about 0.01 to 0.10%.

10 Claims, 1 Drawing Sheet

| SUBSTRATE | TEST INK "A" | TEST INK "B" | TEST INK "C" | TEST INK "D" | TEST INK "E" | SCITEX 1007 INK |
|---|---|---|---|---|---|---|
| XEROX 4024 UNCOATED | NO MOTTLE | NO MOTTLE | NO MOTTLE | NO MOTTLE | NO MOTTLE | NO MOTTLE |
| MEAD 40# COATED | MOTTLE | NO MOTTLE | NO MOTTLE | NO MOTTLE | NO MOTTLE | LIGHT MOTTLE |
| MEAD 80# COATED | MOTTLE | NO MOTTLE | NO MOTTLE | MOTTLE | NO MOTTLE | LIGHT MOTTLE |
| METAL FOIL LAMINATED LOTTERY PAPER | MOTTLE | NO MOTTLE | NO MOTTLE | MOTTLE | MOTTLE | MOTTLE |
| LITHO PREPRINT 100% COVERAGE | HEAVY MOTTLE | LIGHT MOTTLE | NO MOTTLE | MOTTLE | LIGHT MOTTLE | MOTTLE |
| UV COATED MAGAZINE | HEAVY MOTTLE | LIGHT MOTTLE | NO MOTTLE | MOTTLE | MOTTLE | MOTTLE |

FIG. 1

WATER BASED RECORDING FLUID

TECHNICAL FIELD

The present invention relates to aqueous liquid inks for use in continuous ink jet printers and, more particularly, to water based recording fluids which provide uniform print character definition on non water receptive publication substrates.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, the ability to print on non water receptive publication substrates with a water based fluid without the undesirable characteristics of mottling, crawling, or pinholing has long been a goal of printers using high resolution continuous ink jet equipment. Examples of these substrates include ultra violet curable coatings, heavy screen values above 30% applied by other printing processes, non cellulose substrates such as metal foil laminates, spun polyolefin, vinyls, acetates, and plastic impregnated papers. Previous and current water base recording fluids or inks used in this type of application sought to overcome this problem through the use of surfactants or surface active agents. This has met with only partial success in eliminating these problems. Another approach to resolving this problem has been the incorporation of polymeric materials in the ink. The amount of polymer required to produce acceptable images has historically resulted in inks with high viscosities, poor resolubility, and difficulties in printer operation.

It is seen then that there is a need for a water based recording fluid capable of producing uniform high quality images free of mottling, crawling, or pinholing defects, particularly on non water receptive publication substrates.

SUMMARY OF THE INVENTION

This need is met by the extremely dark, water based recording fluid according to the present invention, wherein the fluid is capable of producing uniform high quality images free of mottling, crawling, or pinholing defects on non water receptive publication substrates.

In accordance with one aspect of the present invention, a water based recording fluid, or ink, is provided for use in continuous ink jet printers. The ink is comprised of water soluble dyes, cosolvents, a corrosion inhibitor, biocide, surfactants, a pH modifier, water soluble polymers, and a liquid vehicle. The fluid according to the present invention provides uniform print character definition on non water receptive publication substrates, exhibits extremely good resolubility characteristics which are required to prevent clogging of orifices, and prevents ink jet destabilizing deposits on other fluid contact areas.

Other objects and advantages of the invention will be apparent from the following description and the appended claims.

BRIEF DESCRIPTION OF THE DRAWING

FIG. 1 illustrates mottle results of ink compositions formulated in accordance with the present invention.

DETAILED DESCRIPTION OF THE INVENTION

The ink jet ink composition of the present invention comprises a water based recording fluid provided for use in continuous ink jet printers. The ink is comprised of water soluble dyes, cosolvents, a corrosion inhibitor, biocide, surfactants, a pH modifier, water soluble polymers, and a primary, liquid, vehicle, preferably deionized water.

Specifically, the ink jet ink composition according to the present invention comprises water soluble polymers in conjunction with a carefully selected blend of surfactants, and cosolvents. The resultant ink has a very low polymer content which produces extremely uniform, high quality images, free of mottling, crawling, or pinholing defects, particularly on non water receptive publication substrates, without any of the printer performance problems associated with previous polymer containing inks. The ink composition of the present invention, comprising an extremely low polymer, cosolvent, and surfactant content, produces the same desirable effect as any one or two of these components when used in higher concentrations, but not the undesirable effects.

The dye in the ink jet ink composition of the present invention is water soluble and preferably selected from the group consisting of direct dyes, acid dyes and food dyes. In general, the concentration of the dye should be between about 1% and 6% by weight, depending on the shade and darkness required. In particular, the dye is selected from the group consisting of Direct Black 19, Sulfur Black 2, Direct Yellow 86, Acid Red 249, Direct Blue 199, or mixtures of these dyestuff types.

Examples of commercially available Direct Black 19 dyes include, but are not limited to, Pyrazol Black N Liquid from Clariant Corp.; Water Black 100L Liquid from Orient Chemical; Direct Black 19 Ultra Pure Liquid from Zeneca Inc.; Jet Black 19 Liquid from Leadertech Inc. Examples of commercially available Direct Black 168 dyes include, but are not limited to, Projet Black HSAQ Liquid from Zeneca Inc.; and Duasyn Direct Black HEF-SF Liquid from Hoechst Celanese. Examples of commercially available Sulfur Black 2 dyes include, but are not limited to, Paper Black R Liquid from Clariant Corp.; and Megasulfur Black PL Liquid from Blackman Uhler Chemical. Examples of commercially available Direct Yellow 86 dyes include, but are not limited to, Direct Yellow 86 Liquid From Hodagaya Chemical; Projet Yellow 1 Liquid from Zeneca Inc.; and Leadertech Yellow RL Liquid from Leadertech Inc. Examples of commercially available Acid Red 249 dyes include, but are not limited to, Akacid Brilliant Red B Liquid from Aakash Chemicals; Ricoamide Brilliant Red B Liquid from Rite Industries Inc.; and Projet Magenta 1 Liquid from Zeneca Inc. Examples of commercially available Direct Blue 199 dyes include, but are not limited to, Basacid Blue NB748 Liquid from BASF Corp.; Projet Cyan 1 Liquid from Zeneca Inc.; and Elcomine Bond Blue A Liquid from Rite Industries.

In a preferred embodiment of the ink composition of the present invention, the cosolvents are present in the range of 0.1% to 2.0%; the corrosion inhibitor, biocide, and surfactants are all present in the less than 1.0% range; the pH modifier is present in the range of 0.2% to 1.5%; and the water soluble polymers, represented by but not limited to polymeric acid resin and/or styrene acrylic type, are present in the 0.05% to 0.10% range. The lower range is defined by the amount needed to produce a uniform film. Higher content levels could be used, but result in machine performance impairing high viscosity.

An ink made in accordance with the present invention may be manufactured as follows:

PREPARATION OF INK

Example I

The following is one embodiment of a black ink prepared in accordance with the present invention.

| Component | % Weight |
|---|---|
| Water | 91.25 |
| Corrosion Inhibitor | 0.10 |
| Biocide | 0.20 |
| Surfactant(s) | 0.10 |
| pH Modifier(s) | 1.00 |
| Cosolvent(s) | 1.25 |
| Water Soluble Polymer(s) | 0.15 |
| Water Soluble Black Dye(s) | 5.90 |
| | 100.00 |

When the ink composition was formulated as above in accordance with the present invention, the ink was used in a continuous ink jet printer, such as the type manufactured by Scitex Digital Printing, Inc., in Dayton, Ohio, to test its image quality on non water receptive publication substrates. The prints generated using the ink formulated in accordance herewith produced uniform high quality images free of mottling, crawling, or pinholing defects.

In accordance with the present invention, in Example I above, the corrosion inhibitor is preferably of the Tolytriazole type; the biocide used is preferably 1,2-benzisothiazolin-3-one; the surfactant(s) are preferably mixtures of Acetylenic Diols such as SURFYNOL series DF110L, 104E, and 465 as supplied by Air Products Inc.; the pH modifier(s) are preferably of the chemical family Alkanol Amines represented by Dimethylethanolamine, Diethylethanolamine, and Triethanolamine and supplied by Ashland Chemicals; the Cosolvent(s) are preferably of the glycol ether classes such as Diethylene Glycol n-Butyl Ether, n-Butoxypropanol, Propylene Glycol Methyl Ether, Propylene glycol Phenyl Ether supplied as the Dowanol P series by Dow Chemical; and the water soluble polymer(s) are preferably carboxylated polymer solutions such as SURFYNOL series CT-141, CT-136 and CT324 as supplied by Air Products Inc., and/or JONCRYL 61LV as supplied by S. C. Johnson Co.

In accordance with the present invention, tests were conducted to identify the range of polymer content required to achieve the desired results and to determine the importance of the glycol ethers. Test formulations were made and evaluated by means of drawdowns using a wire wrapped #6 rod on various publication substrates including Xerox 4024 uncoated paper; Mead 40# coated paper; Mead 80# coated paper; Metal foil laminated lottery paper; Litho preprint 100% coverage; and UV coated magazine. The drawdowns were heat dried with a hot air gun.

Test Inks

Example A details one embodiment of an ink prepared in accordance with the present invention:

| Component | Weight % |
|---|---|
| water | 38.20 |
| corrosion inhibitor | 0.10 |
| biocide | 0.20 |
| Direct Black 19 liquid (10% solid) | 50.00 |
| Sulphur Black 2 liquid (10% solid) | 11.50 |
| | 100.00 |

Example B details a second embodiment of an ink prepared in accordance with the present invention:

| Component | Weight % |
|---|---|
| water | 37.43 |
| corrosion inhibitor | 0.10 |
| biocide | 0.20 |
| water soluble polymer | 0.05 |
| glycol ether blend | 0.20 |
| surfactant | 0.05 |
| pH modifier | 0.45 |
| Direct Black 19 liquid (10% solid) | 50.00 |
| Sulphur Black 2 liquid (10% solid) | 11.50 |
| | 100.00 |

Example C details a third embodiment of an ink prepared in accordance with the present invention:

| Component | Weight % |
|---|---|
| water | 37.38 |
| corrosion inhibitor | 0.10 |
| biocide | 0.20 |
| water soluble polymer | 0.10 |
| glycol ether blend | 0.20 |
| surfactant | 0.05 |
| pH modifier | 0.45 |
| Direct Black 19 liquid (10% solid) | 50.00 |
| Sulphur Black 2 liquid (10% solid) | 11.50 |
| | 100.00 |

Example D details a fourth embodiment of an ink prepared in accordance with the present invention:

| Component | Weight % |
|---|---|
| water | 38.10 |
| corrosion inhibitor | 0.10 |
| biocide | 0.20 |
| water soluble polymer | 0.10 |
| Direct Black 19 liquid (10% solid) | 50.00 |
| Sulphur Black 2 liquid (10% solid) | 11.50 |
| | 100.00 |

Example E details a fifth embodiment of an ink prepared in accordance with the present invention:

| Component | Weight % |
|---|---|
| water | 37.50 |
| corrosion inhibitor | 0.10 |
| biocide | 0.20 |

-continued

| Component | Weight % |
|---|---|
| glycol ether blend | 0.20 |
| surfactant | 0.05 |
| pH modifier | 0.45 |
| Direct Black 19 liquid (10% solid) | 50.00 |
| Sulphur Black 2 liquid (10% solid) | 11.50 |
| | 100.00 |

Example F details the components of Scitex 1007 Black Ink, as the control group ink, for comparison purposes, wherein the polyglycol comprises polyglycols such as polypropylene glycol and polyethylene glycol:

| Component | Weight % |
|---|---|
| water | 55.20 |
| corrosion inhibitor | 0.10 |
| biocide | 0.20 |
| pH modifier | 0.90 |
| polyglycol | 0.55 |
| surfactant | 0.05 |
| Direct Black 19 liquid (10% solid) | 28.60 |
| Sulphur Black 2 liquid (10% solid) | 11.50 |
| | 100.00 |

Evaluation of the five test inks comprised a visual observation of the uniformity of the ink surface on the above listed substrates as compared to the Scitex 1007 Black Ink, which was used as a control sample. Test formulations comprised various combinations of the components previously described. The compositions of the test inks are synopsized below and the results of the tests with these inks is detailed in the table of FIG. 1.

Test Ink A contains no polymer, no glycol ethers, and no surfactant; Test Ink B contains low polymer content, and standard glycol ether and surfactant content; Test Ink C contains high polymer content, and standard glycol ether and surfactant content; Test Ink D contains high polymer content, no glycol ether, and no surfactant; Test Ink E contains no polymer content, and standard glycol ether and surfactant content; Scitex 1007 Black Ink is an existing ink containing no polymer and no glycol ethers.

As can be seen in the table of FIG. 1, Test Ink C performed exceptionally well. A preferred embodiment of the ink composition according to the present invention, therefore, comprises (1) a water soluble polymer in 0.05 to 0.10% range with 0.10% the preferred amount, since a lower than minimum amount produces mottling, and a higher than maximum amount results in unacceptable high viscosity for printer performance; (2) glycol ether blend as a cosolvent in the 0.10 to 2.00% range with 0.10% the preferred amount, since a lower than minimum amount produces mottling, and a higher than maximum amount does not produce any additional benefits; and (3) surfactant in the 0.01 to 0.10% range with 0.05% the preferred amount, since a lower than minimum amount produces mottling, and a higher than maximum amount exceeds critical micelle concentration level, i.e., exceeds solubility.

The use of water soluble polymers in conjunction with a carefully selected blend of surfactants, and cosolvents results in an ink according to the present invention, which has a very low polymer content and produces extremely uniform, high quality images, free of mottling, crawling, or pinholing defects on non water receptive publication substrates.

Industrial Applicability and Advantages

The present invention is useful in the field of ink jet printing, and has the advantage of formulating an extremely .dark, water based recording fluid capable of producing uniform high quality images free of mottling, crawling, or pinholing defects on non water receptive publication substrates. The resultant ink does not exhibit any of the printer performance problems associated with previous polymer containing inks. The ink according to the present invention provides uniform print character definition on non water receptive publication substrates, exhibits extremely good resolubility characteristics which are required to prevent clogging of orifices, and prevents ink jet destabilizing deposits on other fluid contact areas.

The invention has been described in detail with particular reference to certain preferred embodiments thereof, but it will be understood that modifications and variations can be effected within the spirit and scope of the invention.

What is claimed is:

1. An ink jet ink composition comprising a water soluble polymer present in an amount of from about 0.05 to 0.15 percent by weight, a glycol ether blend as a cosolvent present in an amount of from about 0.05 to 2.00 percent by weight, a water soluble dye, a surfactant present in an amount of from about 0.01 to 0.10 percent by weight, and a liquid vehicle.

2. An ink jet ink composition as claimed in claim 1 wherein the water soluble polymer comprises a water soluble carboxylated polymer.

3. An ink jet ink composition as claimed in claim 1 wherein the water soluble polymer is present in an amount of about 0.10 percent by weight.

4. An ink jet ink composition as claimed in claim 1 wherein the glycol ether blend is present in an amount of about 0.10 percent by weight.

5. An ink jet ink composition as claimed in claim 1 wherein the surfactant is present in an amount of about 0.05 percent by weight.

6. An ink jet ink composition as claimed in claim 1 wherein the dye is water soluble and selected from the group consisting of direct dyes, acid dyes and food dyes.

7. An ink jet ink composition as claimed in claim 1 wherein the dye is present in an amount of from about 1.00 to 6.00 percent by weight.

8. A process for generating images which comprises incorporating into an ink jet printing apparatus the ink composition of claim 1 and forming images by causing the ink to be expelled in droplets onto a substrate, thereby generating an image on the substrate.

9. A process as claimed in claim 8 wherein the image is generated by a continuous stream ink jet printing process.

10. An ink jet composition as claimed in claim 1 wherein the liquid vehicle comprises deionized water.

* * * * *